INVENTOR.
Ward M Townsend
BY T W Secrest

June 9, 1964  W. M. TOWNSEND  3,136,274
LAWN PERFORATOR

Filed Sept. 12, 1960  5 Sheets-Sheet 5

INVENTOR.
Ward M. Townsend
BY TW Secrest

United States Patent Office 3,136,274
Patented June 9, 1964

3,136,274
LAWN PERFORATOR
Ward M. Townsend, Seattle, Wash., assignor to Kriken Machine Manufacturing Company, Seattle, Wash., a corporation of Washington
Filed Sept. 12, 1960, Ser. No. 55,527
9 Claims. (Cl. 111—6)

This invention relates to a lawn perforator and, more particularly to such a perforator having means for distributing liquid fertilizer to the roots of grass and the like.

It is an object of this invention to provide a lawn perforator having means for positively inserting its tines into a lawn either in a wet soggy state or in an extremely dry state.

A further object is the provision of means for positively withdrawing the tines from the lawn.

It is another object to provide a lawn perforator wherein the tines are all mounted on a frame adapted to be elevated above ground level penetrating position so as to allow the perforator to be moved across a hard surfaced roadway or the like.

An additional object is to provide a perforator having means to vary the force with which the tines penetrate the turf.

A still further object is the provision of a lawn perforator having means to positively pump liquid fertilizer into the lawn through the tines near the base of the roots of the grass.

Another object is the provision of such a perforator having relatively few moving parts.

A still further and important object is the provision of such perforator which is relatively inexpensive to manufacture.

These and other important objects and advantages of the invention will be more fully brought forth upon reference to the following details of explanation and description of the invention, the drawings and the claims.

Figure 4:
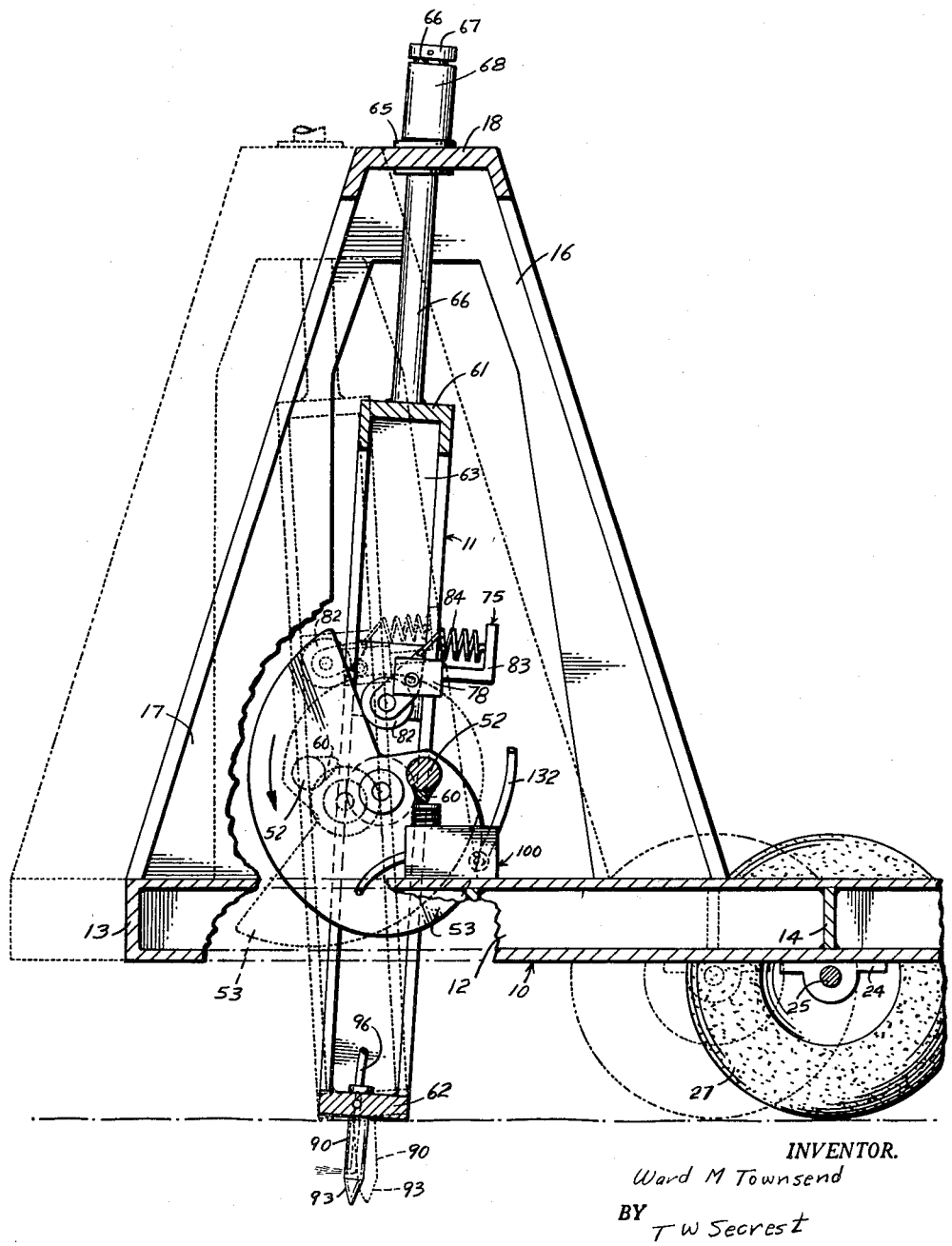

FIGURE 4 is a fragmentary side elevational view of the forward movement of lawn perforator, and illustrates by solid line the relative position of the supporting frame and the movable frame and the position of the cam when the tine is entering the ground and illustrates by broken line the relative position of the supporting frame and the movable frame and the position of the cam when the tine is being pulled out of ground.

Figure 3:
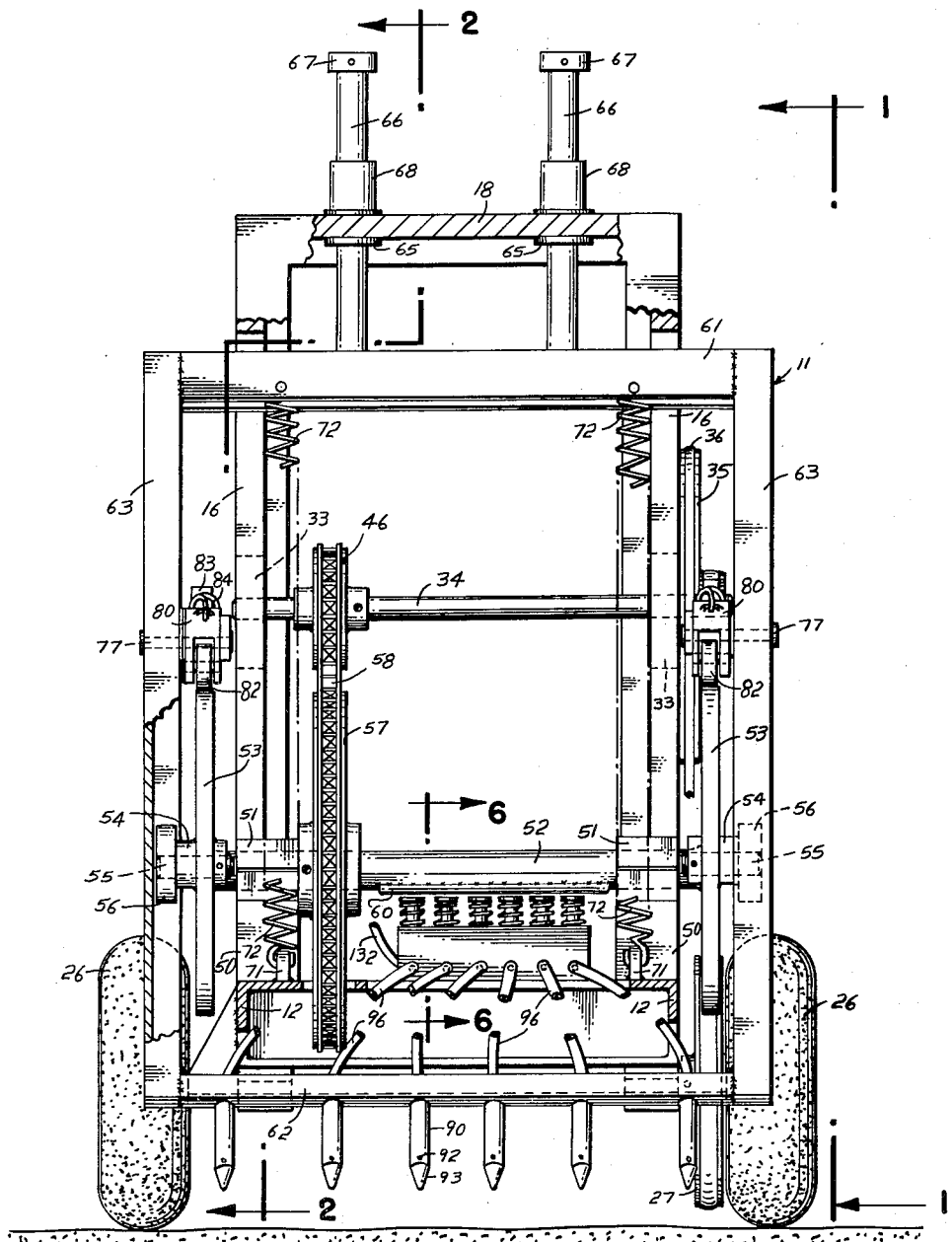
FIGURE 3 is a lateral vertical cross-sectional view taken on line 3—3 of FIGURE 1, and illustrates the relative positions of the supporting and movable frames, the cams for raising the movable frame, and the pumping mechanism for pumping the liquid fertilizer into the tines.
Figure 5:
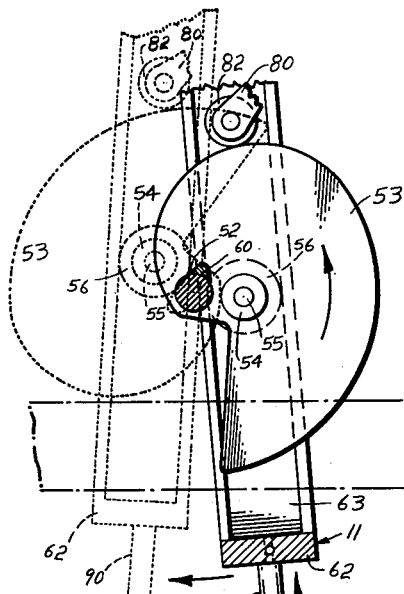
Figure 6:
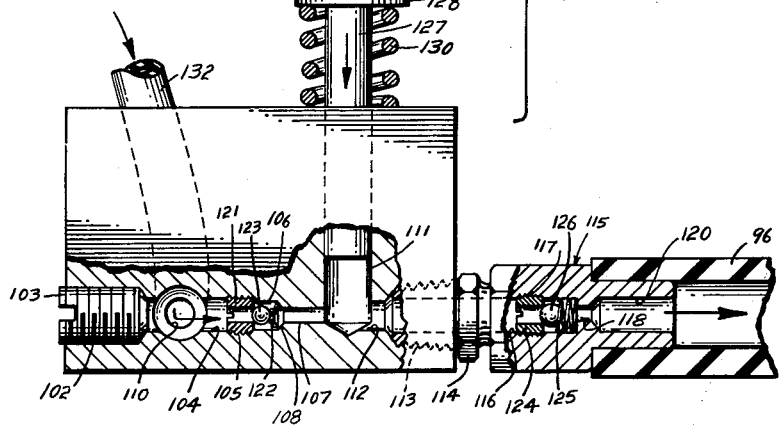

FIGURE 5 is a fragmentary side elevational view of the cam on the fixed frame and the cam follower on the movable frame, and illustrates by solid line the position of the movable frame and the cam when the tine is being raised and illustrates by broken line the position of the movable frame and the cam when the tine is being lowered; and, FIGURE 6, on an enlarged scale and taken on line 6—7 of FIGURE 3 the pumping mechanism for pumping liquid fertilizer from the reservoir to the tines.

Figure 2:
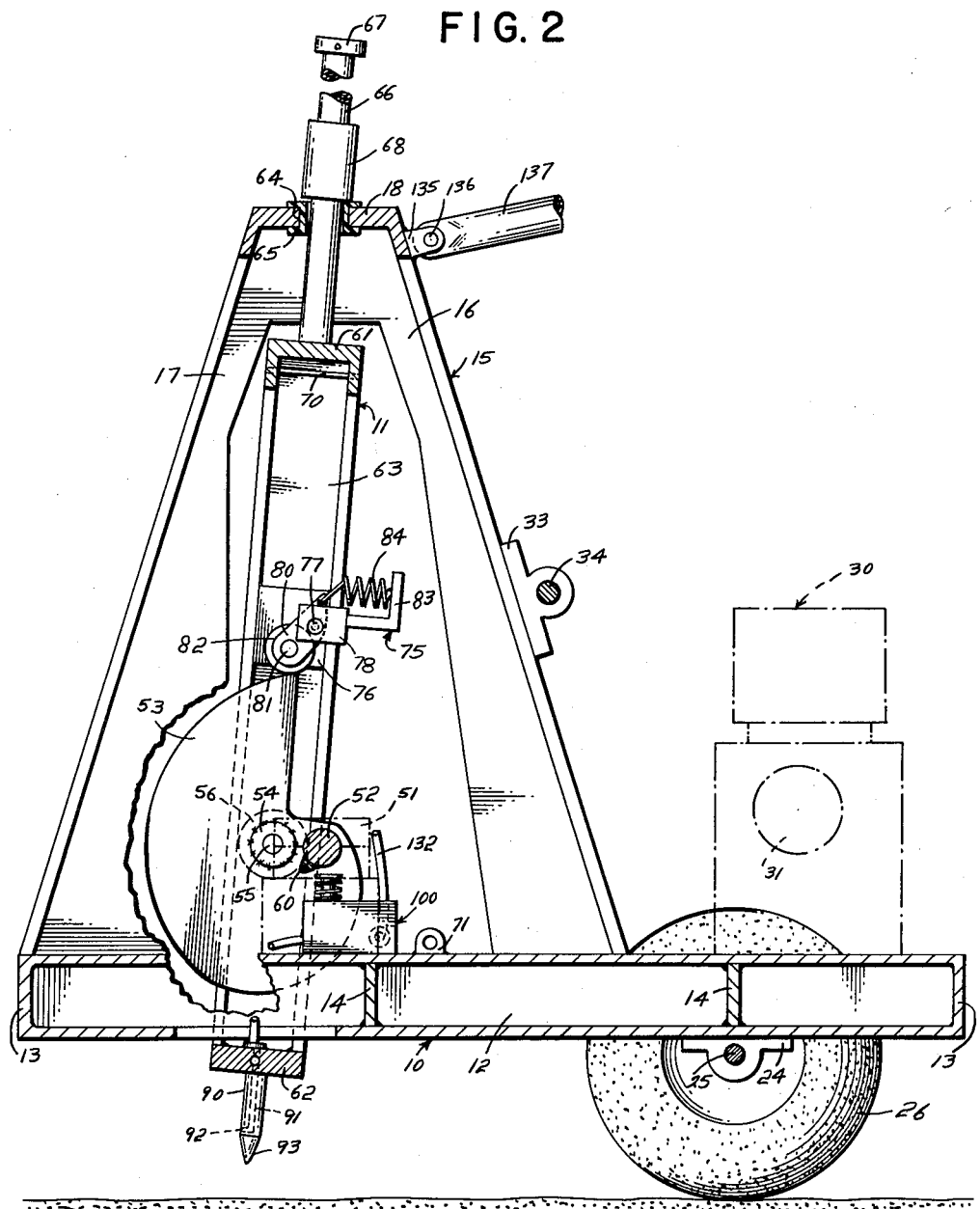
FIGURE 2 is a longitudinal vertical cross-sectional view taken on line 2—2 of FIGURE 3 and illustrates the cam for raising the movable frame.

Referring to the drawings it is seen that the lawn perforator comprises a supporting frame 10 and a movable frame 11. The supporting frame is constructed of bar stock, angle iron and U-channel members. The sides 12 of the supporting frame 10 are of U-channel stock and the ends 13 are also of U-channel stock. The sides are connected by supporting braces 14 for adding rigidity to the supporting frame. It is seen in FIGURE 2 that there are two spaced-apart lateral supporting braces 14.

The supporting frame 10 also comprises a super structure 15. The super structure 15 is attached to the sides 12 and comprises spaced-apart rearward legs 16 and spaced-apart forward legs 17. In other words there are two sets of forward and rearward legs 17 and 16. These two sets of legs are connected by a bracing bar 18.

The lawn perforator is mounted on wheels. Underneath the forward part of the supporting frame 10 there is a mounting block 20, an integral depending bearing standard 21 which is directed downwardly from the mounting block 20. Running between the two spaced-apart standards 21 is a shaft 22. Mounted on this shaft 22 are two spaced-apart small wheels 23, only one being shown in the drawings.

Underneath the back part of the supporting frame 10 is attached a bearing block 24. Running between the spaced-apart bearing block 24 is a shaft 25. Mounted on this shaft 25 are two large wheels 26. Integral with the wheels 26 and mechanically connecting therewith is a pulley 27.

Mounted on the rear of the supporting frame 10 is a power plant 30. This power plant may be a gasoline engine having an output shaft 31. Mounted on the output shaft 31 is a driving pulley 32.

Mounted on the rearward face, and at about the midpoint of the same, of the rearward legs 16 of the superstructure 15 are bearing blocks 33. Running between these bearing blocks is a shaft 34. Mounted on this shaft 34 is a driven pulley 35. A belt 36 runs between the driving pulley 32 and the driven pulley 35. Also, mounted on the shaft 34 is a driving pulley 37. A belt 38 interconnects the driving pulley 37 and the driven pulley 27 associated with the rear wheel 26. On the rear of the supporting frame 10 is an upright lug 40. Pinned to this lug 40 at pin 41 is a lever 42. On the end of this lever 42 is an idler wheel 43. This wheel is attached to the lever 42 by means of shaft or pin 44. From the other end of the lever 42 is a cord 45. As is readily appreciated by pulling on the cord 45 the idler wheel presses against the belt 36 so as to increase the bearing force of the belt 36 against the pulley wheel 35. In this manner it is possible to let the driving pulley 32 freely rotate on the shaft 31 without causing the pulley 35 to rotate or to vary the force of rotation of the belt 36 on the driven pulley 35.

Also mounted on the shaft 34 is a gear 46.

Mounted on the sides 12 of the supporting frame, and between the forward and rearward legs 16 and 17 of the superstructure 15 are two spaced-apart blocks 50. Each of these blocks carries a bearing 51, see FIGURE 3. Journalled in these bearings 51 is a shaft 52. This shaft runs or extends on the outside of the superstructure 15. Mounted on the outer ends of the shaft 52 are two spaced-apart cams 53.

Mounted on the outer face of the cam 53 is a bearing 54. In this bearing 54 there is positioned a shaft 55. Rotatably mounted on the shaft 55 is roller 56. The purpose of the roller will be described in a later part of the application.

Also mounted on the shaft 52 and in alignment with the gear 46 on the shaft 34, is a gear 57. A chain 58 connects the gears 46 and 57. It is seen by this chain-gear arrangement that the shaft 52 is rotated by means of the power plant 30.

It is to be noted that the central portion of the shaft 52 between the bearings 51 is built up so as to define a cam 60. The purpose of this cam is to be more clearly brought out in regard to the pumping action of the pump for forcing liquid fertilizer through hollow tines.

Turning now to the movable frame 11, it is seen that the same is of a generally rectangular configuration having a top bar 61, a lower bar 62, and side bars 63. The side bars are positioned outside of the legs 16 and 17 of the superstructure 15. The lower bar 62 is positioned beneath the sides 12 of the supporting frame 10. The top bar 61 is positioned between the forward and rearward legs 17 and 16 of the superstructure 15 and underneath the cross bar or bracing bar 18. From this it is seen that the position of a portion of the movable frame 11 is inside the supporting frame 10 and the superstructure 15. However, it is to be understood that the movable frame 11 has some freedom of movement and part of the time may project or extend below the supporting frame.

In the bracing bar 18 of the superstructure 15 there are two laterally spaced-apart passageways 64. In each of these passageways is a guide bushing 65.

On the cross bar 61 of the movable frame, and aligned with the passageways 64 in the bracing bar 18 of the superstructure, are two spaced-apart upwardly projecting guides 66. On the upper end of these guides are stops 67. These stops may be positioned on the guides by a setscrew, a pin, or screwed thereon. Positioned on the guides 66, and between the crossbar 18 and the stop 67, are sleeves 68.

As is appreciated the guides 66 in the passageways 64 position the upper part of the movable frame. And, the stop 67 limits the downward movement of the movable frame 11.

Attached to the upper bar 61 are two spaced-apart pins or shafts 70. Each of these shafts 70 is positioned near the upright leg 63. On the upper face of the sides 12 of the supporting frame are two spaced-apart tie-down lugs 71. These tie-down lugs are on each of the side members 12. In other words there are two sets of tie-down lugs 71 and two spaced-apart pins 70. In each set of tie-down lugs there is a spring 72 interconnecting a rear tie-down lug 71 with the pin 70 and a forward spring 73 connecting a tie-down lug 71 with the pin 70. It is seen that the springs 72 and 73, the lower ends of each being on the outside of the movable frame 11, viz., the movable frame 11 being between the lower ends of the springs 72 and 73, urge the movable frame downwardly.

Mounted on the inside of the upright member 63 of the movable frame 11 is mounted a cam follower assembly 75. This assembly comprises a bracing block 76, which is attached directly to the upright member 63. Pinned to the bracing block 76 by means of pin 77, this pin 77 extends through the side wall of the upright member 63, is a bearing block 78. This bearing block has spaced-apart fingers 80 which support a shaft 81. Mounted on shaft 81 is a cam follower 82. Actually, the fingers 80 define a clevis and the inner part of these fingers are rotatable mounted on the pins 77. Projecting rearwardly from the bearing block 78 is a support member 83. This member 83 is integral with the bearing block 78 and is in the configuration of an L. Positioned between the upright leg of the member 83 and the inner end of the fingers 80 is a spring 84. This spring 84 is an expansion spring and not a contraction spring. In other words, the spring 84 bears against the inner part of the fingers 80 so as to rotate the fingers 80 downwardly around the pin 77. By this means the cam follower 82 is rotated downwardly so as to bear against the cam 53 mounted on the shaft 52.

Attached to the lower bar 62 of the movable frame 11 is a series of tines 90. These tines 90 have a longitudinal hollow passageway 91 which merges with a forwardly directed passageway 92. The outlet of the passageway 92 is at approximately the top of the tapered or cone-shaped lower end 93 of the tines 90. The lower bar 62 has a drilled passageway 94 therethrough. This drilled passageway 94 is aligned with the passageway 91 in the tines. Attached to the upper part of this bar 62 is a fitting 95. A tube 96 connects with this fitting and feeds a liquid such as liquid fertilizer to the passageways 94 and 91.

The tube 96 connects with the pumping assembly 100. The pumping assembly 100 comprises a main pumping block 101 having a series of drilled passageways or chambers therein.

There is a tapped passageway 102 for receiving a threaded plug 103. The passageway 102 connects with a smaller inner passageway 104. The inner end of the chamber 104 is tapped at 105. The chamber 104 then reduces in size to form chamber 106 which in turn reduces in size to form a passageway or chamber 107. At the juncture of the chambers 106 and 107 there is a shoulder 108. This shoulder is in effect a valve seat.

Returning to the chamber 104, it is seen that there leads into this chamber or joins at this chamber a passageway or chamber 110. The chambers 104 and 110 are substantially at right angles to each other. They may be at other angles but in this particular configuration, see FIGURE 6, they are at substantially right angles.

In the upper part of the block 101 there is a chamber 111. This chamber is substantially at right angles to the chamber 107 and is in effect a cylinder for a valve stem. Also, referring again to FIGURE 6, it is seen that the chambers 111, 104, and 110 are all at right angles to each other. The chamber 107 joins with the chamber 111. On the other side of the chamber 111 there is a chamber 112 which expands into chamber 113. The chamber 113 is tapped to receive a screw plug 114. The screw plug 114, actually a union, connects with an outlet valve assembly 115.

The union 114 connects with the chamber 116 in the outlet valve assembly 115. Actually, the chamber 116 can be a tapped passageway to receive the threaded union 114. The chamber 116 is tapped at 117. The chamber 116 reduces in its inner end into chamber 118 which in turn enlarges into outlet passageway 120. The outlet passageway 120 connects with the hose or tube 96. Returning now to the valve elements and the pumping elements in the pump assembly block 101 in the outlet valve assembly 115 it is seen that in the chamber 104 there is a threaded bushing 121. This threaded bushing is threaded into the tapped portion 105. It may be of tapped Teflon (tetrafluoropolyethylene). Also, bearing against the valve seat 108 at the juncture of the chambers 106 and 107 is a spring 122. Position between the bushing 121 and the spring 122 is a check ball 123. It is seen that the bushing 121 actually functions as a valve seat for the check ball 123.

Turning now to the outlet valve assembly 115 it is seen that in the passageway 116 there is a bushing 124. This bushing 124 is externally threaded to co-fit with the tapped passageway 116 at part 117. Between the inner end of the passageway 116 and the passageway 118 there is a spring 125. Positions between the bushing 124 and the spring 125 there is a check ball 126. Again, it is seen that the bushing acts as a valve seat for the check ball 126. Returning now to the pump action of the pump it is seen that in the vertical cylinder 111 there is a plunger or a piston 127. This plunger or piston 127 co-fits with the cylinder 111. The plunger terminates in a piston head 128. Between the piston head and the body of the block 101 there is a spring 130. The lower end of the spring 130 may be tack welded to the upper end of the block 101 and the upper end of the spring 130 may be tack welded to the underneath face or surface of the piston head 128.

Turning now to the operation of this pump it is assumed that the plunger 127 is at the bottom of its downward stroke. The shaft 52 has rotated so that the cam 60 is no longer in contact with the piston head 128. Therefore the spring 130 raises the plunger in the cylinder 111. There is created a reduced pressure in the cylinder so liquid flows in through the passageway 110 and past the check ball 123. Also, with the reduction in pressure in the cylinder 111 the check ball 126 seats on the bushing 117. When the plunger is at the top of its stroke and the chamber 111 has liquid in it the shafts 52 rotate so that the cam 60 bears against the piston head 128. This forces the plunger 127 into the cylindrical chamber 111. The pressure increases so that the check valve 123 seats against the bushing 121 so as to prevent the flow of the liquid through this particular valve structure and out of the pumping mechanism. Also, with the increase in pressure the valve 126 is unseated with regard to bushing 124 so that the liquid flows past the valve 126 and into the tube 96. Upon the completion of the downward stroke of the plunger 127 the cycle is again ready to take place.

Mounted on the front of the superstructure 15 is a reservoir 131. This reservoir contains liquid fertilizer. Interconnecting the reservoir 131 and the inlet 110 of pumping body 101 is connecting tube 132.

Turning now to the operation of this lawn perforator it is seen that the primary source of power is the power plant 30. By means of pulleys and chains it is possible to drive the driving wheel 26 so as to move the lawn perforator forward. Also, it is possible to raise and lower the movable frame so as to push or punch the tines into the lawn and simultaneously to force liquid fertilizer through the passageways in the tines. More particularly, it is seen that with the rotation of the shaft 52 the cam 53 rotates. As a starting point let us assume that the tines are in the lawn, id est, the movable frame is at the lower position. With the rotation of the shaft 52 the cam, see FIGURE 5, rotates counter-clockwise so as to bear against the cam follower 82. As is recalled the cam follower is rigidly attached to the movable frame 15. Again, referring to cam 53, it is seen that this cam has a helicospiral configuration. The cam 53 rotates and the spiral of the cam increases in radius so that the cam follower and the movable frame are moved upwardly. This removes the tines 90 from the lawn. Upon the cam 53 rotating so that the periphery of the cam is the farthest point from the center of the shaft 52 the cam abruptly is cut away so that the cam follower now falls in almost a straight line to almost contact the shaft 52. As the springs 72 and 73 urge the movable frame downwardly the cam follower 82 bears against this part of the cam so as to be in close proximity to the shaft 52. This is illustrated in FIGURE 5. By the dark lines it is seen that the tines are still in the lawn but the movable frame is being raised by the cam 53 so as to withdraw the tines. By the broken lines it is seen that the tines are almost completely withdrawn from the lawn or have been completely withdrawn from the lawn as the cam follower 82 is substantially the extreme radius of the spiral of the cam 53. Upon the cam 53 rotating so that the cam follower 52 passes the extreme radius of this spiral the springs 72 and 73 pull the movable frame 11 downwardly so that the tines are in the lawn.

Attention is called to the fact that when the movable frame is at its highest position and the cam 53 has substantially rotated so that the cam follower 82 is on the extreme radius of the spiral the tines 90 are pointed downwardly and forwardly. Upon the tines being plunged into the earth or lawn they, tines, are relatively fixed. However, it is to be realized that the supporting frame 10 is moving forwardly while the movable frame 11 is substantially fixed with respect to the earth or lawn. Therefore the movable frame at the time the tines are to be withdrawn from the ground is pointed downwardly and rearwardly with respect to the front wheels of the lown perforator. Again, referring to FIGURE 5, it is seen that by the dark lines or the solid lines that the tines 90 are pointed downwardly and rearwardly with respect to the front wheel and are being withdrawn from the lawn. This may be considered the withdrawing stroke. As contrasted with this the broken lines indicate that the tines 90 are almost in position to be plunged into the lawn and they are pointed in a downwardly and forwardly directed position. Again, to be clear with respect to FIGURE 5, the positions of the tines and the movable frame as indicated by the solid and the perforated lines are those between two different places in the lawn or the earth. In FIGURE 4 there is illustrated the position of the tine 90 and the earth for one position of the movable frame but wherein the supporting frame 10 has moved forwardly. In this position the solid line of the movable frame and the tine indicates the position and inclination of the tine when it has been plunged into the earth or lawn and the perforated lines indicate the position and inclination of the tine and frame when the tine is about to be withdrawn from the earth.

Figure 1:
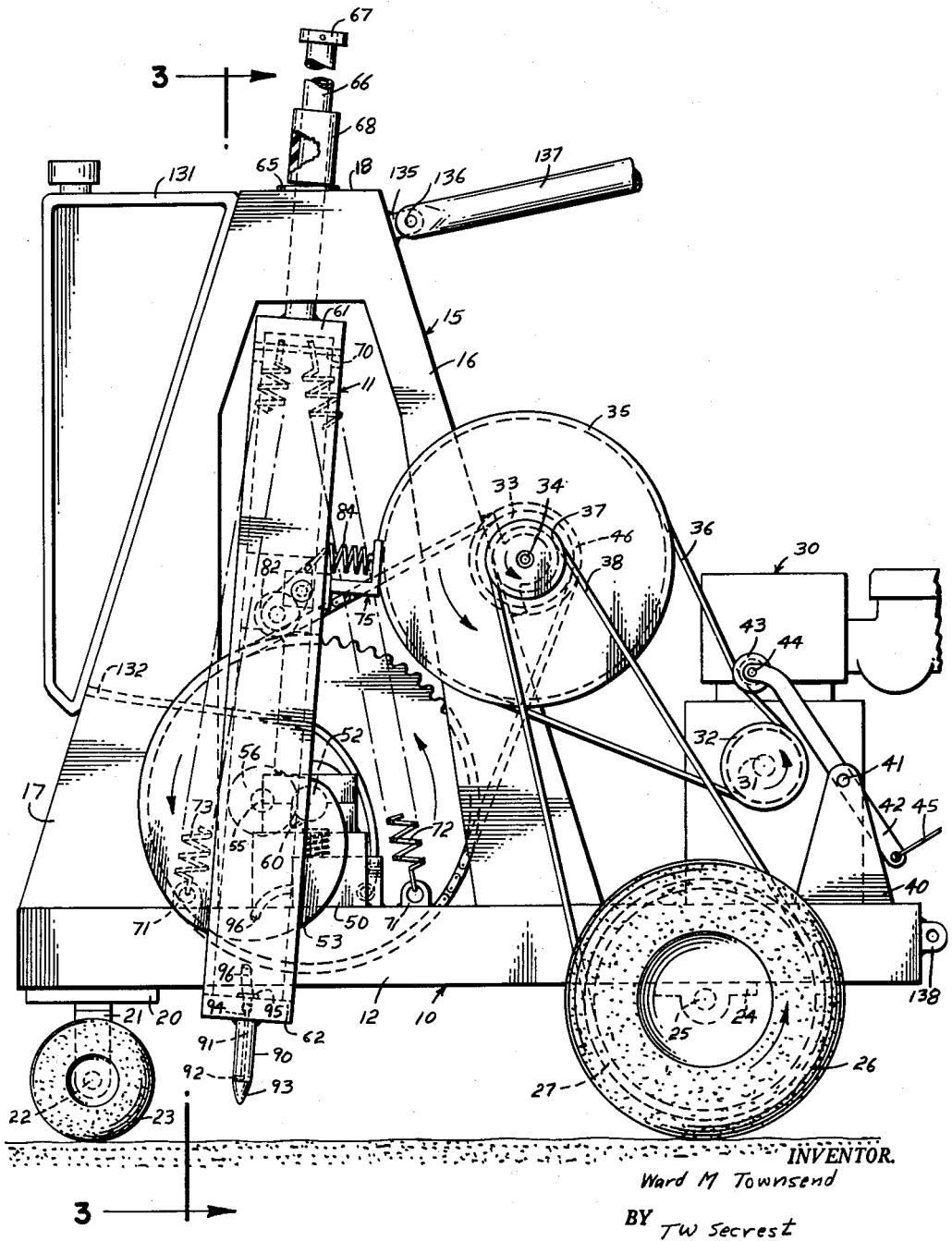
FIGURE 1 is a fragmentary side elevational view of a specific embodiment of the invention constructed in accordance with the preferred teachings thereof, and is taken on line 1—1 of FIGURE 3.

As is seen in FIGURES 1, 2 and 3 the roller 56 contacts the sides of the upright by 63 of the movable frame 11. These rollers assist in positioning the frame 11 and also to allow this frame to easily move up and down.

Having described my invention I want it to be understood that I reserve the right to modify it within the scope of the appended claims. For example, there is illustrated in the drawings a lug 135 having pinned thereto at 136 handle 137. Also, there is a rear lug 138 having a means for towing or pulling a cart or the like. Such minor modifications may be varied or added without affecting the scope of the claims and therefore my invention and claims are meant to cover these minor modifications. Also, it is realized at the present time that such screws and the like are used frequently and therefore these have not been positively identified in all of the uses in this invention but it is to be understood that they are part of the details. In addition, it is realized that pulleys, chains, gears and pulley belts have been described. It is to be realized that in certain instances that pulleys and belts may be used in place of chains and gears and vice versa. Also, in some instances various types of drives may be used without being outside the scope of the invention and the claims.

What I claim is:

1. A lawn perforator, said perforator comprising in combination a supporting frame and a movable frame, said supporting frame having a superstructure, a guide passageway in the upper part of said superstructure, on the upper part of the movable frame an outwardly directed guide, said guide being in said guide passageway, said guide passageway having a larger internal dimension than the guide has an external dimension to allow lateral freedom of movement of the guide in the guide passageway so as to allow the movable frame to vary its position with respect to the supporting earth for the lawn perforator, a spring interconnecting the movable frame and the supporting frame so as to urge the movable frame downwardly, said guide passageway and said guide and said spring guiding the movement of the movement frame to a substantially up and down movement consistent with the lateral freedom of movement of the guide in the guide passageway, a cam and cam follower assembly mounted on the supporting frame and the movable frame for raising the movable frame, a tine attached to the lower part of the movable frame for movement into the lawn, said supporting frame being mounted on wheels, a power plant on said lawn perforator, mechanical means connecting the power plant and the cam for rotating the cam, and mechanical means connecting the power plant and a wheel for rotating the wheel and for moving the lawn perforator.

2. A lawn perforator, said perforator comprising in combination a supporting frame and a movable frame, said supporting frame having a lower base and an upstanding superstructure, said superstructure comprising two sets of standards, each standard comprising a forward leg and a rearward leg, a bracing bar connecting the upper part of the standards, two spaced apart guide passageways in the bracing bar, two spaced apart sets of tie-down lugs on the lower base, each set of lugs comprising a forward lug and a rearward lug, said movable frame being of a box framework having a lower bar and an upper bar and two spaced apart upright side bars, said lower bar being below the base of the supporting frame, said upper bar being positioned underneath the bracing bar of the superstructure and between the forward and rearward legs of the standards, on the upper bar two spaced apart upright guides for co-fitting with the two spaced apart guide passageways in the bracing bar, means on the upright guides to prevent the guides' moving completely through and out of the guide passageways, two sets of springs connecting the upper part of the movable frame and the two sets of tie-down lugs, each set of said springs comprising a forward spring connecting with the forward lug and a rearward spring connecting with the rearward lug, a horizontal shaft mounted on said supporting frame, two spaced apart cams on said shaft, a cam follower mounted on each of said two spaced apart upright side bars for cooperation with one of said associated cams, a first driven gear on said horizontal shaft, a second shaft mounted on the supporting frame, a first driving gear on the second shaft, a gear chain connecting the first driven gear and the first driving gear, a first driven pulley and a first driving pulley on the second shaft, a power plant on said supporting frame, said power plant having an output shaft and a driving pulley on said output shaft, a pulley belt connecting the driving pulley on said output shaft and the first driven pulley, said supporting frame being mounted on wheels, a second driven pulley in operative driving relationship with one of the wheels, a pulley belt connecting the first driving pulley and the driven pulley on said output shaft, and at least one downwardly directed tine mounted on the lower bar of said movable frame.

3. A lawn perforator, said perforator comprising in combination a supporting frame and a movable frame, said supporting frame having a superstructure, a guide passageway in the upper part of said superstructure, on the upper part of the movable frame an outwardly directed guide, said guide being in said guide passageway, a spring interconnecting the movable frame and tne supporting frame so as to urge the movable frame downwardly, said guide passageway and said guide and said spring guiding the movement of the movable frame to a substantially up and down movement, said guide passageway having a larger internal dimension than the guide has an external dimension to allow lateral freedom of movement of the guide in the guide passageway so as to allow the movable frame to vary its position with respect to the supporting earth for the lawn perforator, said movement of the movable frame to a substantially up and down movement being consistent with the lateral freedom of movement of the guide in the guide passageway, a cam and cam follower assembly associated with the supporting frame and the movable frame for raising the movable frame, a bearing means on said cam, said bearing means contacting said movable frame for moving said movable frame forwardly and rearwardly with respect to the supporting frame, a tine attached to the lower part of the movable frame for movement into the lawn, said supporting frame being mounted on wheels, a power plant on said lawn perforator, mechanical means connecting the power plant and the cam for rotating the cam, mechanical means connecting the power plant and a wheel for rotating the wheel and for moving the lawn perforator, said tine having a passageway therein for directing a liquid into the lawn, a liquid reservoir on the lawn perforator, a connecting means interconnecting the reservoir and the passageway in the tine, and a pump means for pumping the liquid through the passageway in the tine.

4. A lawn perforator, said perforator comprising in combination a supporting frame and a movable frame, said supporting frame having a lower base and an upstanding superstructure, said superstructure comprising two sets of standards, each standard comprising a forward leg and a rearward leg, a bracing bar connecting the upper part of the standards, two spaced apart guide passageways in the bracing bar, two spaced apart sets of tie-down lugs on the lower base, each set of lugs comprising a forward lug and a rearward lug, said movable frame being of a box framework having a lower bar and an upper bar and two spaced apart upright side bars, said lower bar being below the base of the supporting frame, said upper bar being positioned underneath the bracing bar of the superstructure and between the forward and rearward legs of the standards, on the upper bar two spaced apart upright guides for co-fitting with the two spaced apart guide passageways in the bracing bar, means on the upright guides to prevent the guides' moving completely through and out of the guide passageways, two sets of springs connecting the upper part of the movable frame and the two sets of tie-down lugs, each set of said springs comprising a forward spring connecting with the forward lug and a rearward spring connecting with the rearward lug, a horizontal shaft mounted on said supporting frame, two spaced apart cams on said shaft, a cam follower mounted on each of said two spaced apart upright side bars for cooperation with one of said associated cams, a first driven gear on said horizontal shaft, a second shaft mounted on the supporting frame, a first driving gear on the second shaft, a gear chain connecting the first driven gear and the first driving gear, a first driven pulley and a first driving pulley on the second shaft, a power plant on said supporting frame, said power plant having an output shaft and a driving pulley on said output shaft, a pulley belt connecting the driving pulley on said output shaft and the first driven pulley, said supporting frame being mounted on wheels, a second driven pulley associated with one of the wheels, a pulley belt connecting the first driving pulley and the second driven pulley, at least one downwardly directed tine mounted on the lower bar of said movable frame, said tine having a hollow passageway therein, a reservoir for liquid mounted on said supporting frame, a pump for pumping liquid to the passageway in said tine, said pump being mounted on said perforator, said pump comprising a plunger, a cam on said horizontal shaft for moving said plunger, and a conveying tube between the reservoir and the pump, and a conveying tube between the pump and the tine.

5. A lawn perforator, said perforator comprising in combination a supporting frame and a movable frame, said supporting frame having a superstructure, guide means in the superstructure and the movable frame, said guide means comprising a guide passageway in the upper part of said superstructure, on the upper part of the movable frame an outwardly directed guide, said guide being in said guide passageway, guiding the movement of the movable frame to a substantially up and down movement with said guide passageway having a larger internal dimension than the guide has an external dimension to allow lateral freedom of movement of the guide in the guide passageway so as to allow the movable frame to vary its position with respect to the supporting earth for the lawn perforator, said movement of the movable frame to a substantially up and down movement being consistent with the lateral freedom of movement of the guide in the guide passageway, means interconnecting the movable frame and the supporting frame to urge the movable frame in a downwardly direction, a cam and cam follower assembly mounted on the supporting frame and the movable frame for raising the movable frame, means to rotate the cam, and a tine attached to the lower part of the movable frame for movement into the lawn.

6. A lawn perforator, said perforator comprising in combination a supporting frame and a movable frame, said supporting frame having a superstructure, guide means in the superstructure and the movable frame, said guide means comprising a guide passageway in the upper part of said superstructure, on the upper part of the movable frame an outwardly directed guide, said guide being in said guide passageway, guiding the movement of the movable frame to a substantially up and down movement with said guide passageway having a larger internal dimension than the guide has an external dimension to allow lateral freedom of movement of the guide in the guide passageway so as to allow the movable frame to vary its position with respect to the supporting earth for the lawn perforator, said movement of the movable frame to a substantially up and down movement being consistent with the lateral freedom of movement of the guide in the guide passageway, means interconnecting the movable frame and the supporting frame to urge the movable frame in a downwardly direction, a cam and cam follower assembly mounted on the supporting frame and the movable frame for raising the movable frame means to rotate the cam, a tine attached to the lower part of the movable frame for movement into the lawn, said tine having a passageway therein for directing a liquid into the lawn, a liquid reservoir on the lawn perforator, a connecting means interconnecting the reservoir and the passageway in the tine, and a pump means for pumping the liquid through the passageway in the tine.

7. A lawn perforator, said perforator comprising in combination a supporting frame and a movable frame, said supporting frame having a superstructure, a guide passageway in the upper part of said superstructure, on the upper part of the movable frame an outwardly directed guide, said guide being in said guide passageway, said guide passageway having a larger internal dimension than the guide has an external dimension to allow lateral freedom of movement of the guide in the guide passageway so as to allow the movable frame to vary its position with respect to the supporting earth for the lawn perforator, a spring interconnecting the movable frame and the supporting frame so as to urge the movable frame downwardly, a cam and cam follower assembly mounted on the supporting frame and the movable frame for raising the movable frame, a bearing means on said cam, said bearing means being off center with respect to the cam, said bearing means contacting said movable frame for moving said movable frame with respect to the supporting frame, a tine attached to the lower part of the movable frame for movement into the lawn, said supporting frame being mounted on wheels, a power plant on said lawn perforator, mechanical means connecting the power plant and the cam for rotating the cam, and mechanical means connecting the power plant and a wheel for rotating the wheel and for moving the lawn perforator.

8. A lawn perforator, said perforator comprising in combination a supporting frame and a movable frame, said supporting frame having a superstructure, guide means in the superstructure and the movable frame, said guide means comprising a guide passageway in the upper part of said superstructure, on the upper part of the movable frame an outwardly directed guide, said guide being in said guide passageway, said guide means allowing lateral freedom of movement of the guide in the guide passageway so as to allow the movable frame to vary its position with respect to the supporting earth for the lawn perforator, means interconnecting the movable frame and the supporting frame to urge the movable frame in a downwardly direction, a cam and cam follower assembly mounted on the supporting frame and the movable frame for raising the movable frame, a bearing means on said cam, said bearing means being off center with respect to said cam, said bearing means contacting said movable frame for moving said movable frame with respect to the supporting frame, means to rotate the cam, and a tine attached to the lower part of the movable frame for movement into the lawn.

9. A lawn perforator, said perforator comprising a combination of a supporting frame and a movable frame, said supporting frame having a superstructure, guide means in the superstructure of the movable frame for guiding the movable frame to a substantially up and down movement but said guide means allowing sufficient lateral movement of the movable frame to vary the position of the movable frame with respect to the supporting earth for the lawn perforator, a yieldable means connecting the supporting frame and the movable frame to urge the movable frame in a downward direction, a cam and cam follower assembly mounted on the supporting frame and the movable frame for raising the movable frame, a bearing means on said cam, said bearing means being off center with respect to the center of the cam, said bearing means contacting said movable frame for moving said movable frame with respect to the supporting frame, means to rotate the cam, a tine attached to the lower part of the movable frame for movement into the lawn, said tine having a passageway therein for directing a liquid into the lawn, a liquid reservoir in the lawn perforator, a connecting means interconnecting the reservoir and the passageway in the tine, and pump means for pumping the liquid through the passageway in the tine.

References Cited in the file of this patent

UNITED STATES PATENTS

| | | |
|---|---|---|
| 13,505 | Bowerman | Aug. 28, 1855 |
| 1,732,972 | Knipfing | Oct. 22, 1929 |
| 2,223,559 | Fleming | Dec. 3, 1940 |
| 2,255,040 | Helbig | Sept. 9, 1941 |
| 2,302,944 | Helbig | Nov. 24, 1942 |
| 2,345,425 | Phillips | Mar. 28, 1944 |
| 2,800,066 | Cohrs | July 23, 1957 |
| 2,838,986 | Fessel | June 17, 1958 |
| 2,866,422 | Colson | Dec. 30, 1958 |
| 2,930,334 | Marron | Mar. 29, 1960 |

FOREIGN PATENTS

| | | |
|---|---|---|
| 826,518 | Germany | Jan. 3, 1952 |